United States Patent [19]

Koo et al.

[11] Patent Number: 5,357,287
[45] Date of Patent: Oct. 18, 1994

[54] METHOD OF AND APPARATUS FOR MOTION ESTIMATION OF VIDEO DATA

[75] Inventors: Hyung S. Koo; Myeong K. Do; Ji H. Yeo; Jong H. Lee; Chong H. Moon, all of Seoul, Rep. of Korea

[73] Assignee: Korean Broadcasting System, Rep. of Korea

[21] Appl. No.: 142,054

[22] Filed: Oct. 28, 1993

[30] Foreign Application Priority Data

May 20, 1993 [KR] Rep. of Korea ................. 93 P 8704

[51] Int. Cl.⁵ ...................... H04N 7/137; H04N 7/01
[52] U.S. Cl. ................................. 348/699; 348/413; 348/416
[58] Field of Search ............... 348/412, 416, 424, 429, 348/422, 413, 699, 384; H04N 7/01

[56] References Cited

U.S. PATENT DOCUMENTS

| | | | |
|---|---|---|---|
| 4,777,530 | 10/1988 | Kondo | 348/699 |
| 4,897,720 | 1/1990 | Wu et al. | 348/412 |
| 4,937,666 | 6/1990 | Yang | 348/413 |
| 5,030,953 | 7/1991 | Chiang | 348/422 |
| 5,081,531 | 1/1992 | Parker | 348/429 |
| 5,130,797 | 7/1992 | Murakami et al. | 348/424 |
| 5,173,772 | 12/1992 | Choi | 348/416 |
| 5,206,723 | 4/1993 | Parke | 348/416 |
| 5,210,605 | 5/1993 | Zaccarin et al. | 348/416 |
| 5,212,547 | 5/1993 | Otsuki | 348/416 |
| 5,212,548 | 5/1993 | de Haan et al. | 348/416 |
| 5,245,423 | 9/1993 | Bernard | 348/416 |
| 5,301,019 | 4/1994 | Citta | 348/416 |

*Primary Examiner*—Tommy P. Chin
*Assistant Examiner*—Vu Le
*Attorney, Agent, or Firm*—Burns, Doane, Swecker & Mathis

[57] ABSTRACT

A method of and an apparatus for motion estimation of video data in a HDTV, capable of providing a block matching algorithm with real time processing. Even when the full search with a complex in hardware is implemented, absolute errors output from blocks are processed in parallel. 16 processor elements are used for calculating absolute errors of $8\times 8$ blocks, so that 16 absolute errors can be calculated for every clock. The block having the minimum absolute error is found by calculating absolute errors of 1024 ($64\times 16$) blocks in the search area. The horizontal and vertical positions of the found block are the motion vectors to be obtained. As 16 absolute errors are calculated for every clock, it is possible to accomplish the real time processing in that each block has the size of 64 ($8\times 8$) pixels and thus the motion vectors can be found after 64 clocks. Accordingly, motion vectors of video data with a very large amount of information, for example, in HDTVs can be estimated in real time. The search area may be designed to be defined by predetermined values within the range from ($-8$, $+7$) to ($-64$, $+63$) in horizontal and/or vertical direction.

6 Claims, 7 Drawing Sheets

| PE 1 (0,0) | PE 2 (8,0) | PE 3 (16,0) | PE 4 (24,0) | PE 5 (32,0) | PE 6 (40,0) | PE 7 (48,0) | PE 8 (56,0) |
|---|---|---|---|---|---|---|---|
| PE 9 (0,8) | PE 10 (8,8) | PE 11 (16,8) | PE 12 (24,8) | PE 13 (32,8) | PE 14 (40,8) | PE 15 (48,8) | PE 16 (56,8) |

Fig. 8

| PE 1 (1,0) | PE 2 (9,0) | PE 3 (17,0) | PE 4 (25,0) | PE 5 (33,0) | PE 6 (41,0) | PE 7 (49,0) | PE 8 (57,0) |
|---|---|---|---|---|---|---|---|
| PE 9 (1,8) | PE 10 (9,8) | PE 11 (17,8) | PE 12 (25,8) | PE 13 (33,8) | PE 14 (41,8) | PE 15 (49,8) | PE 16 (57,8) |

Fig. 9

| PE 1 (0,1) | PE 2 (8,1) | PE 3 (16,1) | PE 4 (24,1) | PE 5 (32,1) | PE 6 (40,1) | PE 7 (48,1) | PE 8 (56,1) |
|---|---|---|---|---|---|---|---|
| PE 9 (0,9) | PE 10 (8,9) | PE 11 (16,9) | PE 12 (24,9) | PE 13 (32,9) | PE 14 (40,9) | PE 15 (48,9) | |

Fig. 10

METHOD OF AND APPARATUS FOR MOTION ESTIMATION OF VIDEO DATA

BACKGROUND

The present invention relates to a method of and an apparatus for motion estimation of video data, and more particularly to a method for compressing video data having a very large quantity of information as in high definition TV (HDTV).

Figure 1:
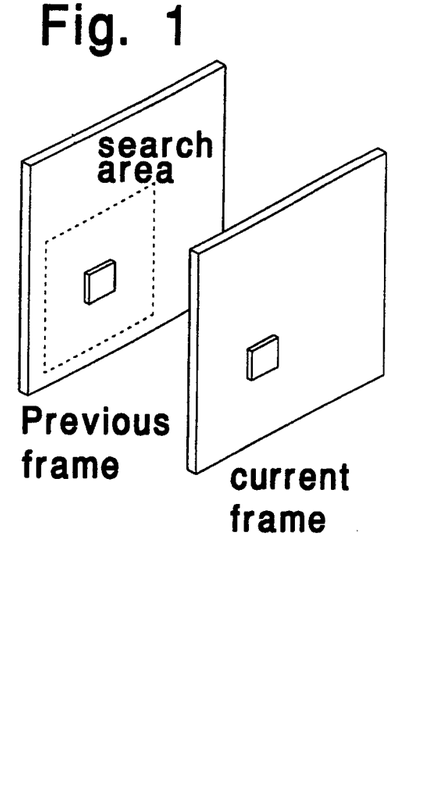
FIG. 1 is a schematic view illustrating a conventional block matching algorithm.

Generally, typical motion estimators for HDTVs developed heretofore utilize a block matching algorithm. Such a block matching algorithm is illustrated in FIG. 1. In accordance with the block matching algorithm, the current frame is divided into smaller rectangular areas, which we call blocks. Each block is shifted to all possible positions within a previously determined window from the previous frame and a mismatch or cost function is computed for each displacement. The displacement that minimizes the cost function determines the motion vectors of the block.

As such a block matching algorithm, there have been proposed various methods. For example, U.S. Pat. No. 4,897,720 discloses a full search block matching algorithm which is capable of minimizing errors, as compared with other methods. Although good in terms of performance, this method is difficult to use in real time processing by use of current techniques. For instance, when a search area for a 8×8 block (namely, 8 horizontal pixels ×8 vertical pixels) is ranged from −32 to +31 in a horizontal direction and from −8 to +7 in a vertical direction, absolute errors are calculated for 64×16 (1024) blocks.

At this time, the calculation for each block is achieved by carrying out calculations for 64 pixels, because each block is constituted by 8×8 pixels. For achieving the calculation for each pixel, it is required to subtract the pixel value of the previous frame from the pixel value of the current frame and then derive the absolute value of the result of the subtraction. Since this calculation should be repeated 64 times and the search area includes totally 1,024 blocks, the amount of data to be calculated is very large. This makes it difficult to realize a hardware enabling the real time processing by use of current techniques.

SUMMARY

Therefore, an object of the invention is to provide a method of and an apparatus for motion estimation of video data in a HDTV, capable of exhibiting the most superior performance upon carrying out the block matching algorithm. The method and apparatus achieve real time processing by computing in parallel absolute errors output from the blocks in carrying out the full search.

In accordance with an embodiment of the present invention, each block has the size of 8×8 pixels while the search area is defined to be ranged from −32 to +31 pixels horizontally and from −8 to +7. However, the search area may be varied by modifying peripheral circuits in the overall system.

For example, the search area may be designed to be defined by predetermined values within the range from (−8,+7) to (−64,+63) in horizontal and vertical directions, by properly modifying the peripheral circuits. This means that the shape of the search area may be any rectangular type.

BRIEF DESCRIPTION OF THE DRAWINGS

Other objects and aspects of the invention will become apparent from the following description of embodiments with reference to the accompanying drawings in which.

DETAILED DESCRIPTION

Figure 2:
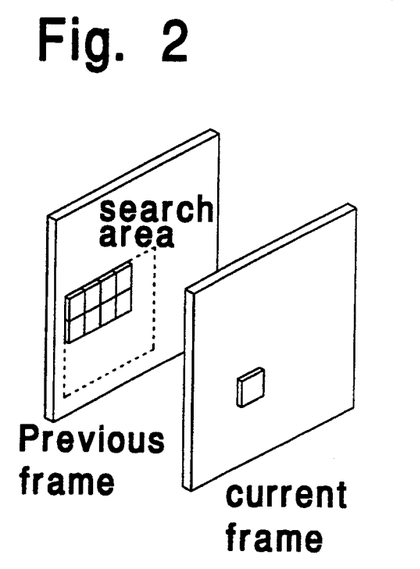
FIG. 2 is a schematic view illustrating a method of searching motion vectors in accordance with the present invention.

The search method according to the present invention is to divide the search area of a current block to be searched into several blocks and find motion vectors from the divided blocks, in parallel, as shown in FIG. 2.

Figure 3:
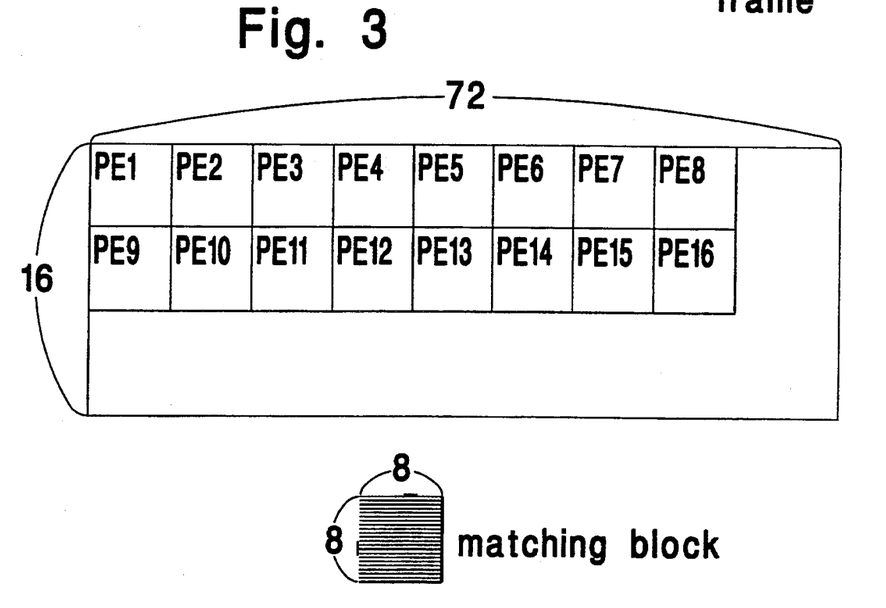
FIG. 3 is a schematic view illustrating a searching method and a matching block where a search area is ranged from −8 to +7 horizontally and from −32 to +31 vertically.

FIG. 3 shows the method illustrated in FIG. 2, in detail. In FIG. 3, there is shown a case where motion vectors are found using 16 processor elements (PEs), when the search area is ranged from −32 to +31 horizontally and from −8 to +7 vertically. In the embodiment of the present invention, 16 processor elements are used for achieving the parallel processing for blocks.

Figure 4A:
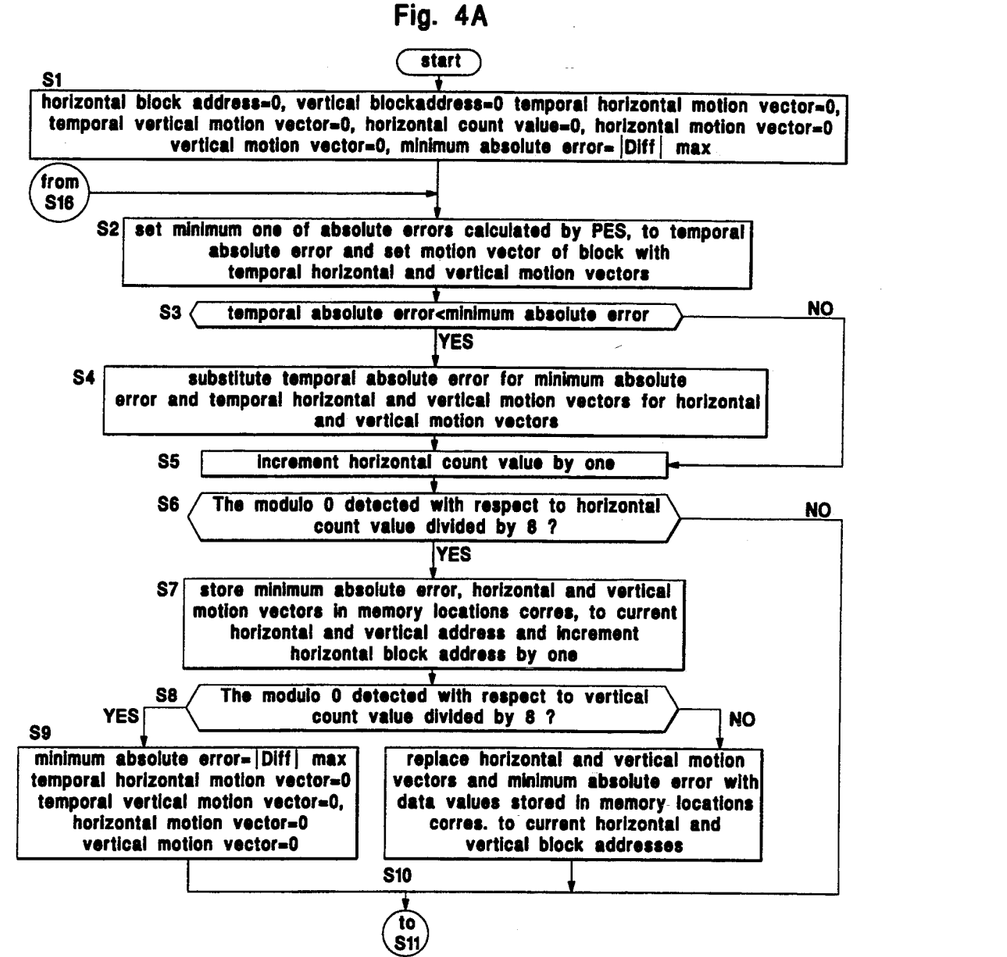
FIGS. 4A and 4B are flow charts illustrating a method of motion estimation of video data in accordance with the present invention.
Figure 4B:
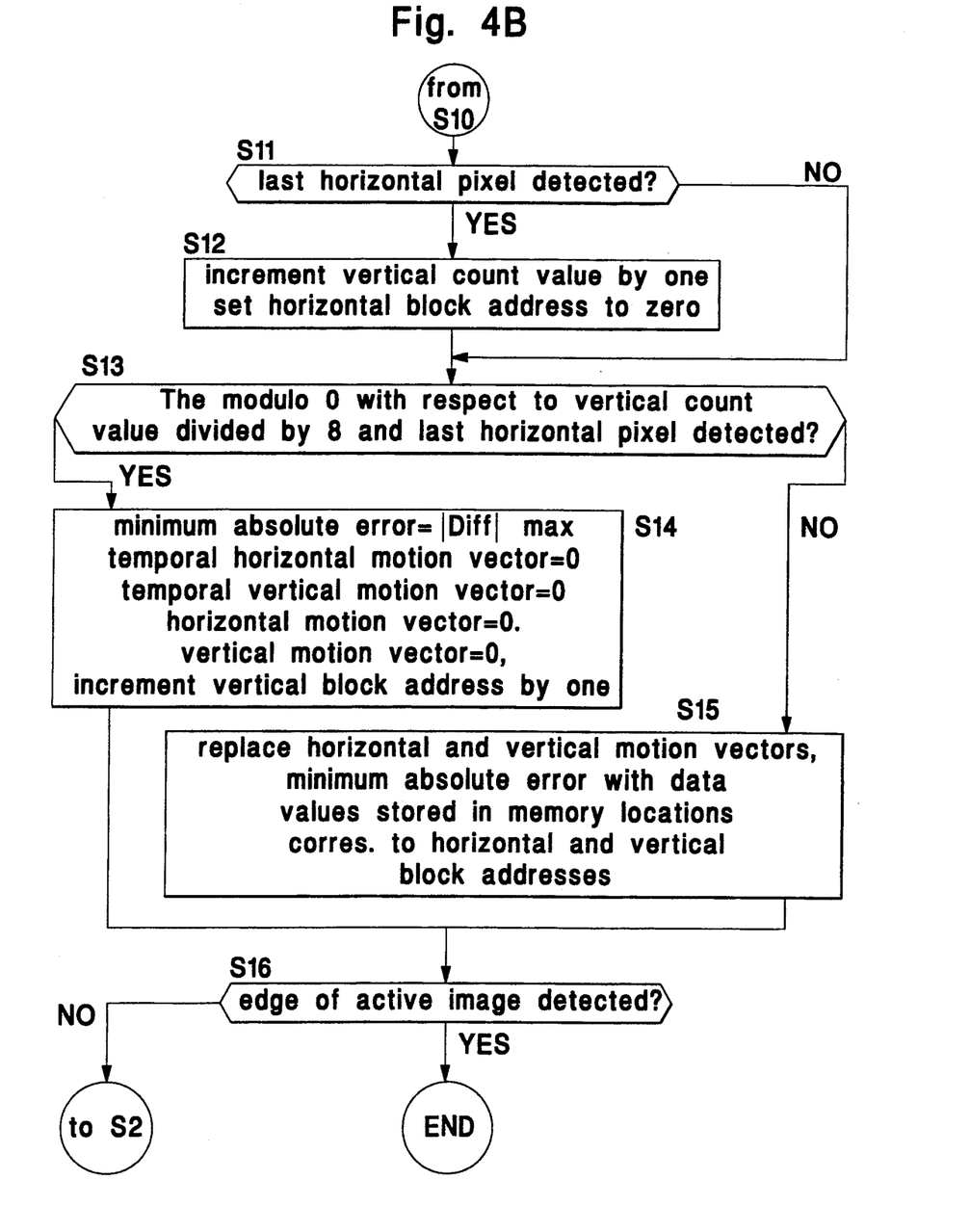

Referring to FIGS. 4A and 4B, there is illustrated a method of motion estimation of video data in accordance with the present invention. As shown in FIGS. 4A and 4B, the motion estimation method comprises a step S1 of resetting horizontal and vertical block addresses, temporal, viz., temporary, horizontal and vertical motion vectors, horizontal and vertical count values and horizontal and vertical motion vectors of each of blocks divided from an image and setting a minimum absolute error to the largest value, and a step S2 of calculating an absolute error in each of processor elements selectively used according to the size of a search area, setting the minimum one of the calculated absolute errors as a temporal, or temporary, absolute error and setting motion vectors of a block having the temporal absolute error as temporal horizontal and vertical motion vectors. Thereafter, a step S3 is carried out which is to compare the temporal absolute error calculated at the step S2 with the minimum absolute error. The method also comprises a step S4 of substituting the temporal absolute error for the minimum absolute error and the temporal horizontal and vertical motion vectors for the horizontal and vertical motion vectors of the block with the temporal absolute error when the minimum absolute error is larger than the temporal absolute error, a step S5 of incrementing the horizontal count value by one when the minimum absolute error is not larger than the temporal absolute error or after the step S4, a step S6 of dividing the incremented horizontal count value by 8 and detecting whether the modulo resulting from the division is 0, a step S7 of storing the minimum absolute error and the horizontal and vertical motion vectors in memory locations corresponding to the current horizontal and vertical block addresses and incrementing the horizontal block address by one, when 0 has been detected at the step S6, and a step S8 of dividing the incremented vertical count value by 8 and detecting whether the modulo resulting from the division is 0, for checking whether the vertical displacement of block corresponds to 8 pixels. A step S9 is then carried out, which is to set the minimum absolute error, the temporal horizontal and vertical motion vectors and the horizontal and vertical motion vectors to their initial values when 0 has been detected at the step S8. The method also comprises a step S10 of replacing the horizontal and vertical motion vectors and the minimum absolute error with the values stored in the memory locations corresponding to the current horizontal and vertical block addresses, when 0 has not been detected at the step S8, a step S11 of detecting whether the current pixel is the last horizontal pixel when 0 has not been detected at the step S6 or after the steps S9 and S10, a step S12 of incrementing the vertical count value by one and setting the horizontal block address to zero when the last horizontal pixel has been detected at the step S11, a step S13 of dividing the vertical count value by 8 and detecting whether the modulo resulting from the division is 0 and whether the current pixel is the last horizontal pixel when neither of 0 or the last horizontal pixel has not been detected or when the vertical count value has been incremented, a step S14 of setting the minimum absolute error, the temporal horizontal and vertical motion vectors and the horizontal and vertical motion vectors to their initial values and incrementing the vertical block address value by one when both 0 and the last horizontal pixel have been detected at the step S13, and a step S15 of incrementing the vertical block address value by one and replacing the minimum absolute error and the horizontal and vertical motion vectors with the values stored in the memory locations corresponding to the current horizontal and vertical block addresses, when 0 or the last horizontal pixel has not been detected at the step S13. Finally, a step S16 is carried out, which is to detect whether an edge of an active image has been detected after the steps S14 and S15, complete the finding of motion vectors when the edge of active image has been detected, and repeat all the steps from the step S2.

In accordance with the present invention, the search area is selected in a range of −8 to +7 pixels horizontally and −64 to +63 pixels vertically.

Figure 5:
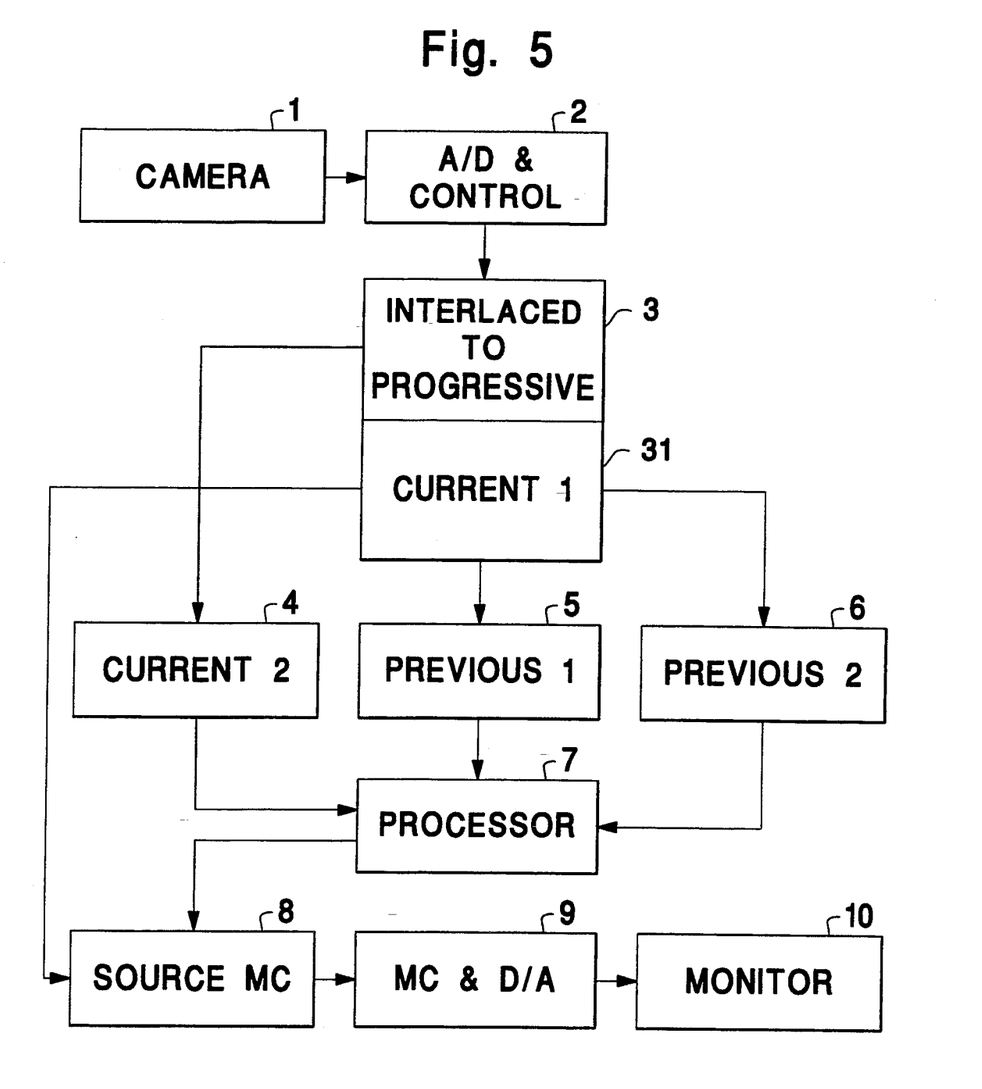
FIG. 5 is a block diagram of an apparatus for motion estimation of video data in accordance with an embodiment of the present invention.

FIG. 5 illustrates a block diagram of an apparatus for motion estimation of video data in accordance with an embodiment of the present invention. As shown in FIG. 5, the apparatus comprises a camera 1 for picking up an image and outputting it in the form of an electrical signal, an A/D converting and controlling part 2 for converting the signal from the camera 1, namely, an analog luminance signal which carries tri-level synchronous signals, into a digital signal and generating a control signal required to be used in the apparatus, and an interlaced to progressive scan converting part 3 for converting image data outputted from the A/D converting and control part 2 from the interlaced scanning mode into the progressive scanning mode. A first current frame memory part 31 is provided in the interlaced to progressive scan converting part 3. The first current frame memory part 31 is adapted for delaying the image data generated by the interlaced to progressive scan converting part 3 and for generating a luminance signal and a control signal delayed by one frame. The apparatus also comprises a second current frame memory part 4, a first previous frame memory part 5, and a second previous frame memory part 6. The second current frame memory part 4 receiving the luminance signal and the control signal from the interlaced to progressive scan converting part 3 receiving one pixel data for every main clock and outputting 8 vertical pixel data in parallel. The first previous frame memory part 5 receives the luminance signal and the control signal generated by the first current frame memory part 31 delayed by one frame and outputs 8 upper vertical pixel data portions of a previous image in parallel. And the second previous frame memory part 6 receives the luminance signal and the control signal generated by the first current frame memory part 31 delayed by one frame and outputs 8 lower vertical pixel data portions of the previous image in parallel. A processor part 7 is also provided which is adapted for receiving the 8 vertical pixel data from the second current frame memory part 4 and the 16 vertical pixel data from the first previous frame memory part 5 and the second previous frame memory part 6, all the pixel data being output in a progressive scanning order, together with the control signals, and determining the absolute error by finding motion vectors from the received pixel data. The apparatus also comprises a memory part 8, a motion compensation memory and D/A converting part 9, and a monitor 10. The memory part 8 is to output image data by the unit of 8×8 block for motion compensation. The motion compensation uses the motion vectors found by the processor part 7 and the luminance signal generated by the first current frame memory part 31. In the motion compensation memory and D/A converting part 9, the motion compensation memory receives the image data from the memory part 8 for motion compensation. The D/A converter reads the image data, converts them from the digital to analog luminance signal, and outputs the analog luminance signal in an interlaced scanner order with control signals. The monitor part 10 displays the luminance signal outputted from the motion compensation memory and D/A converting part 9 to monitor whether the apparatus is normally operated.

Figure 10:
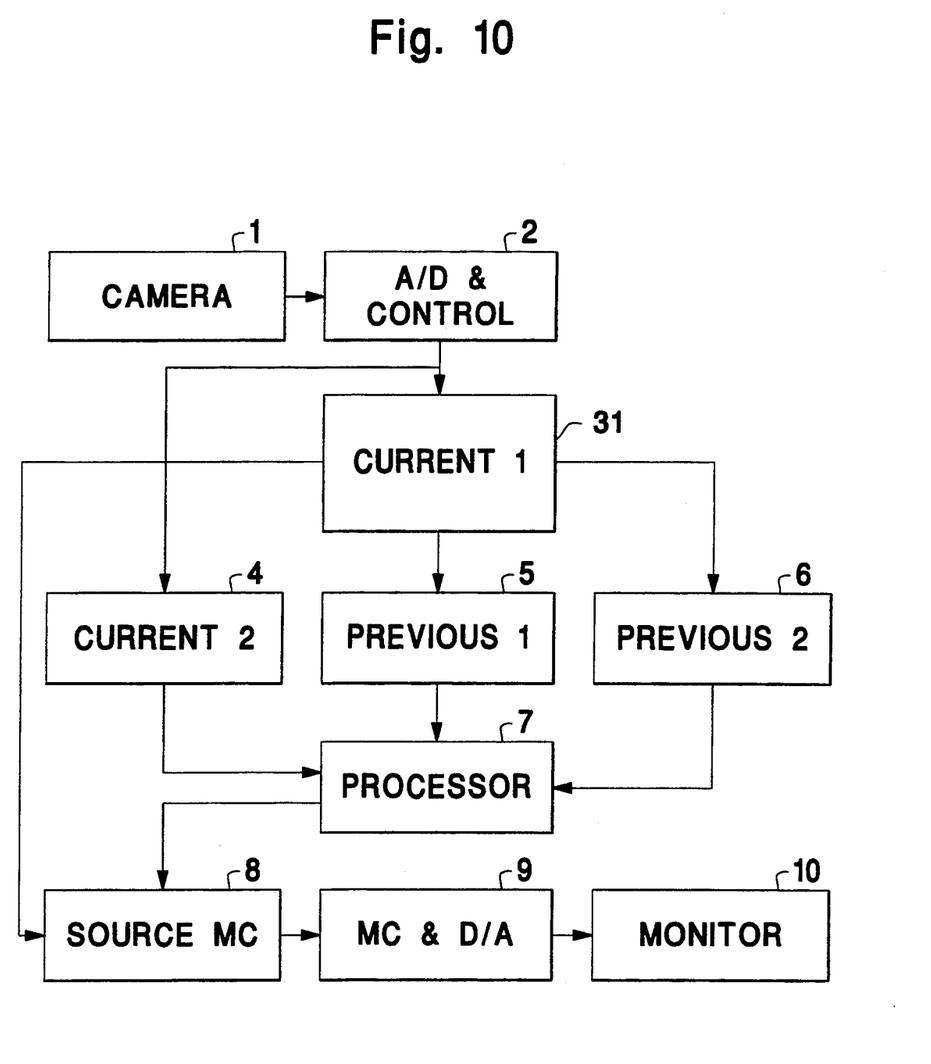
FIG. 10 is a block diagram of an apparatus for motion estimation of video data in accordance with another embodiment of the present invention.

Referring to FIG. 10, there is illustrated a block diagram of an apparatus for motion estimation between fields, in accordance with another embodiment of the present invention. This apparatus has not the interlaced to progressive scan converting part 3 in that it is adapted to estimate motion between fields. The apparatus includes the first and second current frame memory parts 31 and 4 different from those of the apparatus of FIG. 5. That is, the first current frame memory part 31 receives the image data from the A/D converting and control part 2 in the interlaced scanning order, delays them for one frame, and outputs them to the parts 5, 6, and 8. The second current frame memory part 4 receives the luminance signal and control signal from the A/D converting and control part 2 in a manner that one pixel data is received for every main clock and outputs 8 vertical pixel data in parallel. Other constituting elements of the apparatus of FIG. 10 operate in the same manner as the apparatus of FIG. 5.

Figure 6:
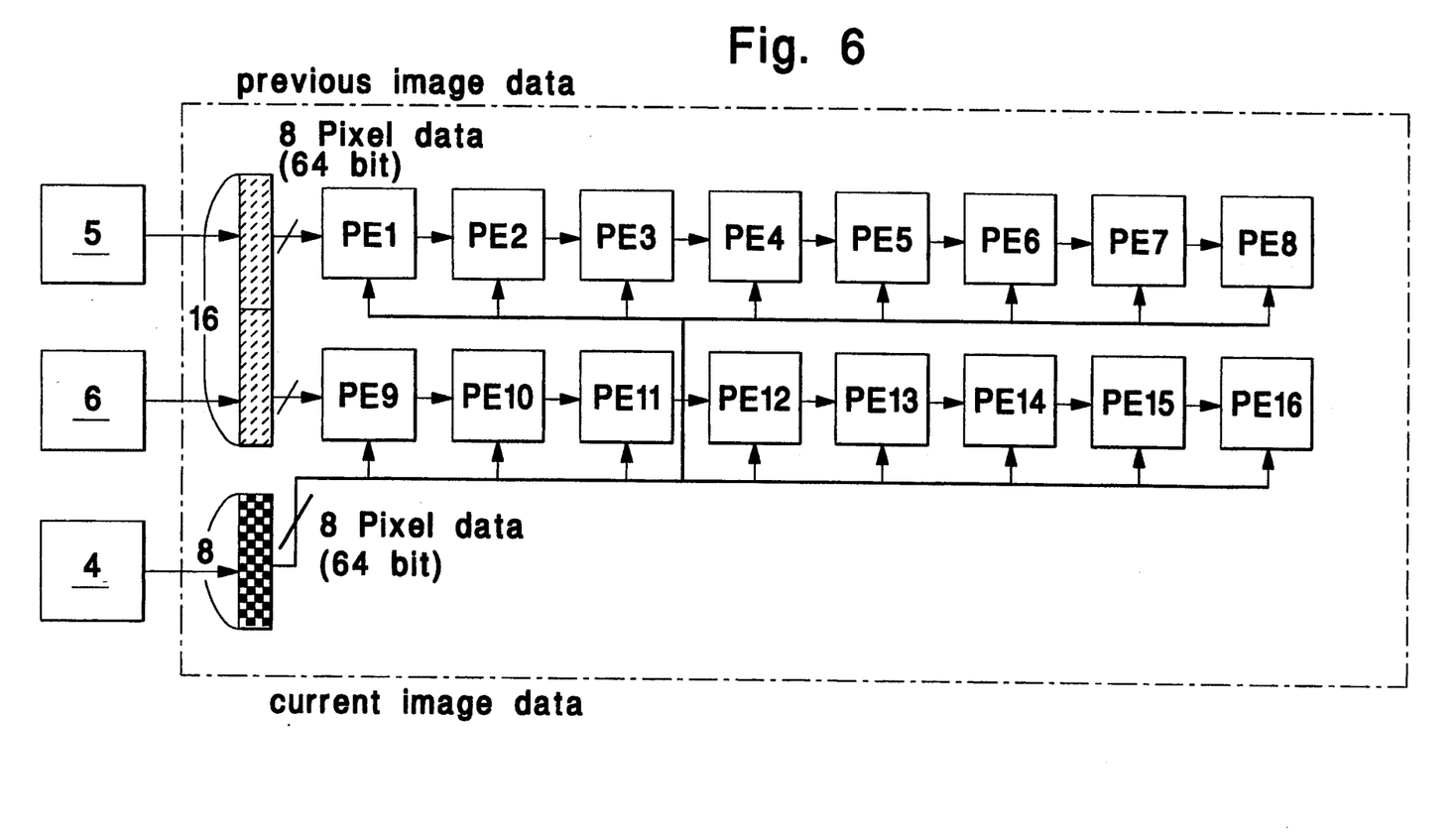
FIG. 6 is a block diagram of a processor part which is employed in the apparatus according to the present invention.

FIG. 6 is a block diagram of the processor part 7 which can be employed in both the apparatus of FIGS. 5 and 10. In FIG. 6, the processor part 7 is illustrated as comprising 16 processor elements PE1 to PE16 connected in parallel.

The processor part 7 may use 4 to 256 processor elements connected in parallel. The number of processor elements may be optionally determined, depending on the desired search area. For example, the number of processor elements may be 4, 16, 32, 64, 128 or 256.

Now, the present invention will be described in detail.

The search method according to the present invention is to divide the search area of a block to be searched into several blocks and find motion vectors from the divided blocks, in parallel, as shown in FIG. 2.

FIG. 3 shows the method illustrated in FIG. 2, in detail. In FIG. 3, there is shown a case where motion vectors are found using 16 processor elements, when the search area is ranged horizontally from $-32$ to $+31$ and vertically from $-8$ to $+7$. In the embodiment of the present invention, 16 processor elements are used for achieving the parallel processing.

FIGS. 4A and 4B are flow charts illustrating the method of the present invention. At the first step S1, horizontal and vertical block addresses which correspond to addresses of blocks divided from an active image data are set to 0. A horizontal value counter is used for incrementing the horizontal address after 8 main clocks. Initially, the horizontal value counter is set to 0. Also, a vertical value counter increments the vertical block address every 8 horizontal lines corresponding to the vertical size of block. The vertical value counter is initially set to 0.

The minimum absolute error means the minimum one of possible absolute errors of a $8 \times 8$ block. The initial value of the minimum absolute error is set to the largest value of the absolute errors possibly expressed by hexadecimal digits.

The horizontal and vertical motion vectors are the motion vectors of a block to be searched in the current frame. They are initially set to 0. The temporary horizontal and vertical motion vectors mean values of temporary motion vectors. These values are used for finding the values of horizontal and vertical motion vectors of the block having the minimum absolute error in a search area.

The 16 processor elements calculate 16 absolute errors where each processor element calculates each absolute error of a $8 \times 8$ block for every main clock.

The block having the minimum absolute error is found by calculating absolute errors of 1024 ($64 \times 16$) blocks in the search area. The horizontal and vertical positions of that block are the motion vectors to be obtained.

As 16 absolute errors are calculated for every main clock in the calculations of FIG. 3, it is possible to accomplish the real time processing in that each block has the size of 64 ($8 \times 8$) pixels and thus the motion vectors can be found after 64 clocks.

At the second step S2, temporal absolute error and temporal horizontal and vertical motion vectors are calculated. The temporal absolute error is the minimum one of the absolute errors which are calculated by the processor elements selectively used according to the size of the search area. At this time, the motion vectors of the minimum absolute error are the temporal horizontal and vertical motion vectors to be obtained.

At the third step S3, the temporal absolute error calculated at the second step S2 is compared with the minimum absolute error. Initially, the minimum absolute error of each block is set to the largest value. This value is then compared with the temporal absolute error found in the search area.

When the minimum absolute error is determined to be larger than the temporal absolute error at the step S3, it is replaced by the temporal absolute error. Also, the horizontal and vertical motion vectors of the block being searched are replaced by the temporal horizontal and vertical motion vectors, respectively (Step S4). Then, the horizontal count value is incremented by one (Step S5).

However, when the minimum absolute error is not larger than the temporal absolute error, only the horizontal count value is incremented by one, without substitutions for the minimum absolute error and motion vectors (Step S5). Thereafter, the incremented horizontal count value is divided by 8, so as to detect whether the modulo is 0 (Step S6). This detection is made for checking whether the motion vectors are found in every $8 \times 8$ block because the image is divided into $8 \times 8$ blocks. When the modulo after the division by 8 becomes 0, data of the minimum absolute error and the horizontal and vertical motion vectors are stored in memory locations of a SRAM corresponding to the current horizontal and vertical block addresses (Step S7).

The above procedure also repeats vertically with the unit of $8 \times 8$ block until the end of the search area. After derivation of the motion vectors and minimum absolute error in a search area, the modulo becomes 0 as explained in the above paragraph. Therefore the next step continues.

When the modulo is 0 at the step S8, the minimum absolute error is set to the largest value again. All the temporal horizontal and vertical motion vectors and horizontal and vertical motion vector values are set to 0 (Step S9). The reason for setting the values to 0 is because the block being processed is a new block when viewed in the vertical direction. When the modulo is not 0 at the step S8, the block being processed is not the new block. In this case, the previously calculated values stored in the SRAM are used as the minimum absolute error and horizontal and vertical motion vector values (Step S10).

When the modulo is 0 at the step S6 or after the steps S9 and S10, it is checked whether the current pixel is the last horizontal pixel (Step S11). The detection of the last horizontal pixel means that video data has been increased to a next line.

When the last horizontal pixel has been detected at the step S11, the vertical count value is incremented by one and the horizontal block address is set to zero (Step 12). In a similar way to the case when the last horizontal pixel has not been detected, the incremented vertical count value is then divided by 8 for checking whether the modulo is 0 and a determination is made about whether the current pixel is the last horizontal pixel, so as to detect whether the current pixel corresponds to the first vertical pixel of a new block (Step 13). When the modulo is 0, namely, in the case of the new block, the minimum absolute error, the temporal horizontal and vertical motion vectors and the horizontal and vertical motion vectors are set to their initial values. Then, the vertical block address value is incremented by one (Step 14). On the other hand, when the modulo has been detected not to be 0 at the step S13, namely, when the current block is not the new block, the values of horizontal and vertical motion vectors and minimum absolute error are replaced by those stored in the SRAM (Step 15).

At the step S16, it is checked whether the boundary of the active image has been detected. When the boundary of active image has been detected, the finding of motion vectors is completed. Where the boundary of active image has not been detected, absolute errors are calculated by the processor elements selectively used according to the size of the search area. The minimum one of the calculated absolute errors is used as the temporal absolute error. Then, the procedures are repeated from the step S2. Thus the full search the image can be made.

Referring to FIG. 5, there is illustrated a block diagram of the overall system for motion estimation between successive frames in accordance with the present invention. The system comprises a camera 1 for picking up an image and an A/D converting and control part 2 receiving a signal from the camera 1.

Data from the camera 1 is an analog luminance signal which carries tri-level synchronous signals. Accordingly, the A/D converting and control part 2 serves to convert the analog luminance signal into a digital signal and generate a control signal required to be used in the system. The control signal from the A/D converting and control part 2 is sent to an interlaced to progressive scan converting part 3.

The luminance signals in the active area are A/D converted to produce digital image data. The luminance signal carries synchronous signals during the blanking period. Using the synchronous signals, a control signal which is to be used in the overall system is produced.

In the interlaced to progressive scan converting part 3 which converts the interlaced scan line into the progressive scan line for an estimation of motion between successive frames, there is provided a first current frame memory part 31 for achieving a delay for one frame. The camera 1 is the interlaced scanning type while the motion estimation is associated with the progressive scanning. It is for this reason that the provision of the interlaced to progressive scan converting part 3 is required upon designing the system for motion estimation between successive frames. However, such an interlaced to progressive scan converting part 3 is unnecessary for an estimation of motion between fields.

The first current frame memory part 31 for a delay by one frame is a delay memory for forming the current frame output from the interlaced to progressive scan converting part 3 into the previous frame. Data passing through the delay memory is sent to previous frame memories (namely, the first and second previous frame memory parts), whereas data not passing through the delay memory is sent to a second current frame memory part.

The second current frame memory part 4 receives a luminance signal and a control signal from the interlaced to progressive scan converting part 3, receiving one pixel data for every main clock. The second current frame memory part 4 outputs 8 vertical pixel data simultaneously. The reason why 8 pixel data are simultaneously outputted is that image data is processed in parallel.

The first previous frame memory part 5 receives a luminance signal and a control signal output from the first current frame memory part 31 and delayed by one frame and outputs 8 vertical pixel data simultaneously.

The second previous frame memory part 6 receives the same data as the first previous frame memory part 5. However, data output from the second previous frame memory part 6 is 8 vertical pixel data next to 8 vertical pixel data output from the first previous frame memory part 5.

On the other hand, the processor part 7 is adapted to find motion vectors. The processor part 7 receives 8 vertical pixel data from the second current frame memory part 4 and 16 vertical pixel data, namely, 8 vertical pixel data from the first previous frame memory part 5 and 8 vertical pixel data from the second previous frame memory part 6. Using all the received vertical pixel data, the processor part 7 finds motion vectors and sends them to a memory 8 for motion compensation.

In this case, data output of the second current frame memory part 4 and the first and second previous frame memory parts 5 and 6 are not carried out in the interlaced scanning manner, but in the progressive scanning manner.

Accordingly, the memory 8 for motion compensation reads out image data by the unit of $8 \times 8$ block, using the motion vectors found by the processor part 7 and the luminance signal output from the first current frame memory part 31. That is, the memory 8 for motion compensation includes two banks not shown, one of which reads out data by the unit of $8 \times 8$ block and the other of which stores the received luminance signal. The reason why data is read out by the unit of $8 \times 8$ block is that the motion estimation is carried out by the unit of $8 \times 8$ block.

In other words, after 8 horizontal pixel data are read, the vertical address is incremented by one. Then, reading data in the horizontal direction is initiated at the first horizontal address again.

The motion compensation memory and D/A converting part 9 receives image data by the unit of $8 \times 8$ block and reads horizontally active pixel portions of the image data. After completing the reading of one line, it increments the vertical address and reads pixel data of a next line. The motion compensation memory and D/A converting part 9 converts the read data in the form of the digital luminance signal into an analog signal which is, in turn, output in the interlaced scanning manner, together with the control signal.

The analog luminance signal from the motion compensation memory and D/A converting part 9 is sent to and displayed on a monitor 10 so that the operator monitors whether the overall system is normally operated.

FIG. 6 illustrates an embodiment of the processor part 7 wherein 16 processor elements are utilized. Data received in the processor elements PE1 to PE16 which are connected in parallel are 8 vertical pixel data output from the second current frame memory part 4 and 16 pixel data output from the first and second previous frame memory parts 5 and 6.

The processor part 7 also receives predetermined control signals from the second frame memory part 4 which is the current memory and the first and second previous frame memory parts 5 and 6 which are previous memories. Accordingly, it is possible to solve a problem of synchronization, using the control signals. Here, synchronization means that pixel data output from the previous frame memories are synchronized with pixel data output from the current memory.

The 8 current vertical pixel data are input to 16 processor elements simultaneously. On the other hand, the 8 upper ones of the 16 previous vertical pixel data are input to the processor element PE1 while the 8 lower ones are input to the processor element PE9.

At this time, the 8 pixel data (64 bits) received in the processor element PE1 are shifted for every main clock. Since each processor element includes 8 D-flip-flops for each pixel data, the shift of 8 pixel data from the processor element PE1 to the processor element PE2 is actually achieved at the 9th clock after 8 main clocks.

As apparent from the above description, the previous pixel data is sent from the processor element PE1 to the processor element PE8 in a pipeline manner. The lower ones of the 16 previous vertical pixel data participate in the absolute error calculation while being shifted from the processor element PE9 to the processor element PE16.

The 8 current pixel data output from the current frame memory are received in each processor element for every main clock. After 8 main clocks, data of a 8×8 block is produced and then moved to a portion of each processor element for calculating the absolute error. Data of the next 8×8 block participate in the calculation after the next 8 main clocks. The current pixel data being input are different from the previous pixel data in terms of the data input form. For the previous pixel data, the data input is carried out such that when the vertical address is incremented, data corresponding to the incremented address is input. However, the inputting of current pixel data is carried out such that after the input of vertical data of 8 times, 8 vertical pixel data for the next block are input at the 9th clock.

Figure 7:
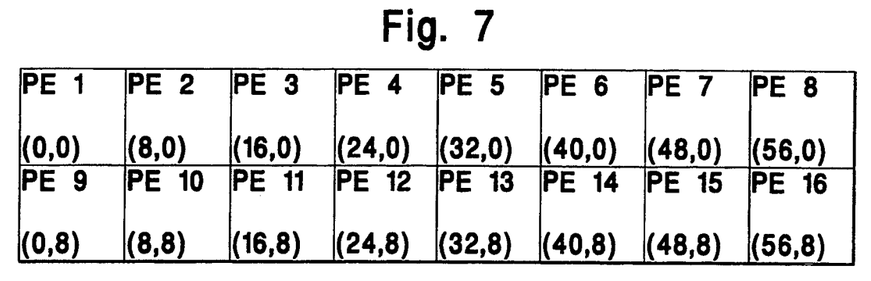
FIG. 7 is a diagram illustrating motion vectors initially found by processor elements of the processor part.

FIG. 7 shows motion vectors of each processor element. In FIG. 7, (0, 0) corresponds to the motion vector (−32, −8), whereas (63, 15) corresponds to the motion vector (+31, +7).

The processing in a manner as above-mentioned makes it possible to reduce the number of bits corresponding to sign bits and thus to simplify the calculation process. The processing of the sign bits is achieved by correcting and sending the sign bits when the motion vectors are sent to the memory 8 for motion compensation after their calculation.

FIG. 7 illustrates the initial calculation of motion vectors of 8×8 blocks. In FIG. 7, (0, 0) of the processor element PE1 represents the 8×8 block corresponding to the motion vector (−32, −8), whereas (8, 0) of the processor element PE2 represents the 8×8 block corresponding to the motion vector (−24, −8).

That is, the condition shown in FIG. 7 represents that the pixels have been horizontally moved by a distance corresponding to 8 pixels. The numerals indicated beneath each processor element represents the motion vector. For one clock, accordingly, 16 absolute errors and motion vectors corresponding to the absolute errors are calculated.

The processor part has a peripheral circuit including portions for searching the minimum absolute error from 16 absolute errors for every clock and the motion vectors corresponding to the searched minimum absolute error.

Figure 8:
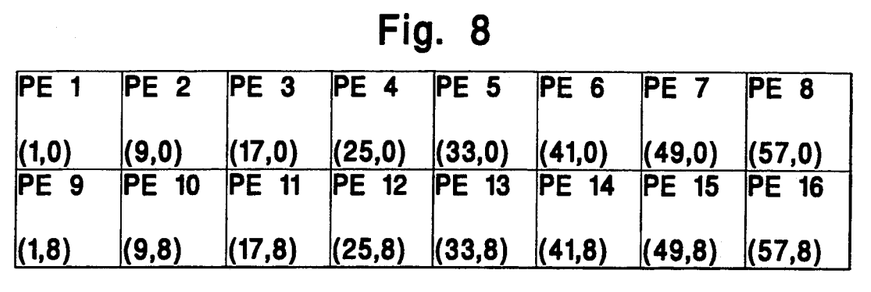
FIG. 8 is a diagram illustrating motion vectors found after a horizontal displacement for one clock.

Referring to FIG. 8, there is illustrated a condition that the pixels have been horizontally moved by one clock. When compared with the condition of FIG. 7, the condition of FIG. 8 shows that the motion vector has been horizontally increased by one in each processor element.

That is, in a case of data input in the horizontal direction, the motion vector is horizontally increased. The horizontal increase in the motion vector is achieved only 7 times. At 8th increase, the same condition as expressed in FIG. 7 is obtained. This is because 8th increase means the processing for a block positioned next to the just processed block when viewed in the horizontal direction.

Figure 9:
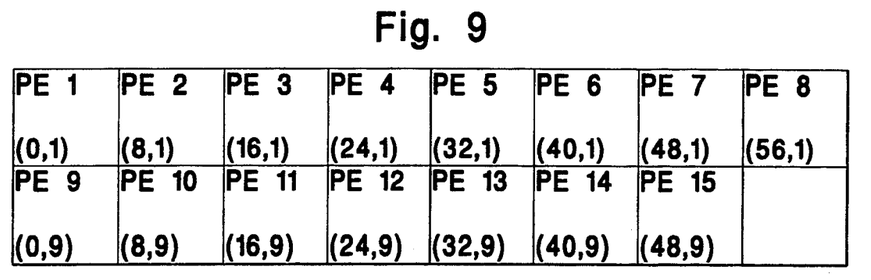
FIG. 9 is a diagram illustrating motion vectors found after a vertical displacement corresponding to one clock.

FIG. 9 illustrates motion vectors obtained when a block is vertically moved one horizontal blanking. The calculation of the motion vectors is carried out as follows.

In the case of FIG. 9, the vertical portion of each motion vector is increased by one, as compared with the case of FIG. 7. In a similar way to the case of FIG. 8, the increase in vertical motion vector is achieved only 7 times. At the 8th increase, each vertical address is the same as expressed in FIG. 7. Thus, the motion vectors in both the horizontal and vertical directions are reset by the unit of 8 clocks.

As apparent from the above description, the motion vectors of each 8×8 block is actually found by calculating them while achieving 8 times of horizontal movements and 8 times of vertical movements.

After the horizontal movements of 8 times according to the method illustrated in FIGS. 4A and 4B, the data used for the above-mentioned calculations are stored in the SRAM. When the vertical movement is carried out after completing the calculation of horizontal motion vectors, the finding of motion vectors is carried out, using the data stored in the SRAM. After the vertical movements of 8 times, motion vectors are sequentially found while pixel data is horizontally shifted.

In the above-mentioned manner, all motion vectors at signal intervals in which active frame data is present are found. After completing the processing for the active frame data, finding of all motion vectors for one frame is accomplished.

Although the present invention has been described as being applied to apparatus for motion estimation between successive frames, it may be also equivalently applied to apparatus for motion estimation between fields.

Referring to FIG. 10, there is illustrated a block diagram of the overall system of an apparatus for motion estimation between fields, in accordance with another embodiment of the present invention. This apparatus is different from the apparatus of FIG. 5 in that it has no interlaced to progressive scan converting part.

In the apparatus of FIG. 10, the first and second current frame memory parts 31 and 4 are different from those of the apparatus of FIG. 5. That is, the first current frame memory part 31 of the apparatus of FIG. 10 outputs the luminance signal and control signal after delaying image data output in the interlaced scanning manner from the A/D converting and control part 2, for one frame. The second current frame memory part 4 receives the luminance signal and control signal from the A/D converting and control part 2 in a manner that one pixel data is received for every main clock and outputs 8 vertical pixel data in parallel.

The form of data input to the processor part 7 in the apparatus of FIG. 10 is identical to that of the apparatus of FIG. 5. However, data at the second current frame memory part 4 and the first and second previous frame memory parts 5 and 6 are not input in the progressive scanning manner, but input in the interlaced scanning manner. Accordingly, the data associated with each odd field is subjected to the estimation of motion between successive odd fields, whereas the data associated with each even field is subjected to the estimation of motion between successive even fields.

Other elements of the apparatus of FIG. 10 operate in the same manner as the apparatus of FIG. 5 and thus their description will be omitted for simplicity of the description.

As apparent from the above description, in accordance with the present invention, it is possible to provide a block matching algorithm with a most superior performance and thus achieve the real time processing in that even when the full search with a complex hardware is implemented, absolute errors output from blocks are processed in parallel. As a result, motion vectors of video data with a very large amount of information, for example, in HDTVs can be estimated in real time.

Although the preferred embodiments of the invention have been disclosed for illustrative purposes, those skilled in the art will appreciate that various modification, additions and substitutions are possible, without departing from the scope and spirit of the invention as disclosed in the accompanying claims.

What is claimed is:

1. A method of estimating motion in video data in a high definition television comprising the steps of:
    (a) initializing horizontal and vertical block addresses, temporary horizontal and vertical motion vectors, horizontal and vertical count values, and horizontal and vertical motion vectors of blocks divided from an image, and setting a minimum absolute error to a largest value;
    (b) determining an absolute error for each of a plurality of blocks divided from a search area in the image, setting the minimum one of the determined absolute errors as a temporary absolute error, and setting motion vectors of the block having the temporary absolute error as temporary horizontal and vertical motion vectors;
    (c) comparing the temporary absolute error set in step (b) with the minimum absolute error;
    (d) substituting the temporary absolute error for the minimum absolute error and substituting the temporary horizontal and vertical motion vectors for the horizontal and vertical motion vectors of the block having the temporary absolute error when the minimum absolute error is larger than the temporary absolute error;
    (e) incrementing the horizontal count value by one;
    (f) dividing the incremented horizontal count value by a predetermined value of detecting whether the modulo is zero;
    (g) storing the minimum absolute error and the horizontal and vertical motion vectors in a memory at locations corresponding to current horizontal and vertical block addresses, and incrementing the horizontal block addresses by one, when zero has been detected in step (f); p1 (h) dividing the vertical count value by the predetermined value and detecting whether the modulo is zero, for checking whether the block has been displayed vertically by the predetermined number of pixels;
    (i) setting the minimum absolute error to the largest value, and initializing the temporary horizontal and vertical motion vectors and the horizontal and vertical motion vectors, when zero has been detected in step (h);
    (j) replacing the horizontal and vertical motion vectors and the minimum absolute error with the values stored in the memory locations corresponding to the current horizontal and vertical block addresses, when zero has not been detected in step (h);
    (k) detecting whether a current pixel is a last horizontal pixel when zero has not been detected in step (f) or after steps (i) and (j);
    (l) incrementing the vertical count value by one and setting the horizontal block address to zero when the last horizontal pixel has been detected in step (k);
    (m) dividing the vertical count value by the predetermined value, and detecting whether the modulo is zero and whether the current pixel is the last horizontal pixel, when the last horizontal pixel has not been detected or after step (k);
    (n) setting the minimum absolute error to the largest value, initializing the temporary horizontal and vertical motion vectors and the horizontal and vertical motion vectors, and incrementing the vertical block address value by one, when both the modulo is zero and the last horizontal pixel has been detected in step (m);
    (o) incrementing the vertical block address value by one, and replacing the minimum absolute error and the horizontal and vertical motion vectors by the values stored in the memory locations corresponding to the current horizontal and vertical block addresses, when the modulo is not zero or the last horizontal pixel has not been detected in step (m); and
    (p) detecting whether and edge of the image has been detected after steps (n) and (o), completing the finding of motion vectors when the edge of active image has been detected by determining horizontal and vertical positions of the block having the minimum absolute error, and repeating steps (b)-(p) when the edge of the image has not been detected.

2. The method of claim 1, wherein the search area is selected in a range of count values from (−8, +7) to (−64, +63) in at least one of the horizontal and vertical directions.

3. An apparatus for motion estimation of video data in a high definition television comprising:
    a camera for converting an image into an analog electrical signal;
    A/D converting and controlling means for converting the analog electrical signal into a digital signal comprising interlaced image data and for generating an associated control signal;
    interlaced-to-progressive-scan converting means for converting the interlaced image data into progressive-scan image data;
    first current frame memory means, provided in the interlaced-to-progressive-scan converting means, for delaying the progressive-scan image data and for generating a delayed luminance signal and a delayed associated control signal delayed by one frame;
    second current frame memory means, connected to the interlaced-to-progressive-scan converting means, for receiving one pixel of the progressive-scan image data for every occurrence of a main clock signal and for producing a predetermined number of vertical pixel data in parallel;

first previous frame memory means for receiving the delayed luminance signal and the delayed associated control signal from the first current frame memory means and for producing a predetermined number of upper vertical pixel data portions of a previous image in parallel;

second previous frame memory means for receiving the delayed luminance signal and the delayed associated control signal from the first current frame memory means and for producing the predetermined number of lower vertical pixel data portions of the previous image in parallel;

processor means for receiving the vertical pixel data from the second current frame memory means and the upper and lower vertical pixel data from the first and second previous frame memory means, together with the delayed associated control signals, and for determining an absolute error by finding motion vectors from the received pixel data;

a motion compensation memory for reading out image data in blocks of predetermined size using the motion vectors found by the processor means and the delayed luminance signal generated by the first current frame memory means; and motion-compensation-memory-and-D/A-converting means for receiving the blocks of image data from the motion compensation memory, reading horizontally active pixel portions of the image data, reading pixel data of a next line, and converting the read data into an analog interlaced luminance signal and an associated control signal.

4. The apparatus of claim 3, wherein the processor means comprises a plurality of processing elements connected in parallel for carrying out motion estimation between frames of the analog electrical signal.

5. An apparatus for motion estimation of video data in a high definition television comprising:

a camera for converting an image into an analog electrical signal;

A/D converting and controlling means for converting the analog electrical signal into a digital signal comprising interlaced image data and for generating an associated control signal;

first current frame memory means for delaying the interlaced image data and for generating a delayed luminance signal and a delayed associated control signal delayed by one frame;

second current frame memory means, connected to the A/D converting and controlling means, for receiving one pixel of the image data for every occurrence of a main clock signal and for producing a predetermined number of vertical pixel data in parallel;

first previous frame memory means for receiving the delayed luminance signal and the delayed associated control signal from the first current frame memory means and for producing a predetermined number of upper vertical pixel data portions of a previous image in parallel;

second previous frame memory means for receiving the delayed luminance signal and the delayed associated control signal from the first current frame memory means and for producing a predetermined number of lower vertical pixel data portions of the previous image in parallel;

processor means for receiving the vertical pixel data from the second current frame memory means and the upper and lower vertical pixel data from the first and second previous frame memory means, together with the delayed associated control signals, and for determining an absolute error by finding motion vectors from the received pixel data;

a motion compensation memory for reading out image data in blocks of predetermined size using the motion vectors found by the processor means and the delayed luminance signal generated by the first current frame memory means; and motion-compensation-memory-and-D/A-converting means for receiving the blocks of image data from the motion compensation memory, reading horizontally active pixel portions of the image data, reading pixel data of a next line, and converting the read digital data into an analog luminance signal and an associated control signal.

6. The apparatus of claim 5, wherein the processor means comprises a plurality of processing elements connected in parallel for carrying out motion estimation between fields of the analog electrical signal.

* * * * *